United States Patent
Wyschofsky et al.

(10) Patent No.: US 6,740,258 B1
(45) Date of Patent: May 25, 2004

(54) PROCESS FOR THE PRODUCTION OF SYNTHESIS GAS IN CONJUNCTION WITH A PRESSURE SWING ADSORPTION UNIT

(75) Inventors: Michael Wyschofsky, Dortmund (DE); Vincent Liu, Bochum (DE)

(73) Assignee: Krupp Uhde GmbH, Dortmund (DE)

( * ) Notice: Subject to any disclaimer, the term of this patent is extended or adjusted under 35 U.S.C. 154(b) by 155 days.

(21) Appl. No.: 09/715,800

(22) Filed: Nov. 17, 2000

(30) Foreign Application Priority Data

Nov. 19, 1999 (DE) .......................... 199 55 676

(51) Int. Cl.$^7$ ................................. C01B 3/26
(52) U.S. Cl. .................. 252/373; 422/201; 423/652
(58) Field of Search .................. 252/373; 48/61, 48/127.9; 422/200, 201

(56) References Cited

U.S. PATENT DOCUMENTS 4,938,685 A * 7/1990 Noakes et al. ............. 252/373
4,963,339 A * 10/1990 Krishnamurthy et al. ... 423/650

FOREIGN PATENT DOCUMENTS

| DE | 329435 A1 | 4/1984 |
| DE | 337078 A1 | 5/1985 |
| EP | 015413 B1 | 2/1983 |

* cited by examiner

*Primary Examiner*—Wayne A. Langel
(74) *Attorney, Agent, or Firm*—Katten Muchin Zavis Rosenman

(57) ABSTRACT

Process and plant for the production of synthesis gas, hydrogen and/or reducing gas by means of a primary reformer heated on the shell side, used in conjunction with a pressure swing adsorption unit for purifying the product gas, the purpose of which is to find a solution to the problem of utilising the work potential of the fuel gas from the pressure swing adsorption unit, which is used to fire the primary gas reformer.

This is achieved by supplying the waste desorption gas from the pressure swing adsorption unit to the inlet side of an ejector, which is driven by a part stream of the fuel gas for the primary reformer, the waste desorption gas being admixed to a main fuel gas stream and/or a regulating gas stream, depending on the particular mode of operation.

4 Claims, 1 Drawing Sheet

PROCESS FOR THE PRODUCTION OF SYNTHESIS GAS IN CONJUNCTION WITH A PRESSURE SWING ADSORPTION UNIT

BACKGROUND OF THE INVENTION

The invention relates to a process and a plant for the production of synthesis gas, hydrogen and/or reducing gas by means of the use of a primary reformer heated on the shell side, which is used together with a pressure swing adsorption unit to purify the product gas.

In a primary reformer steam and a feed gas containing carbon, such as methane, react on the tube side according to the linearly dependent equations (1, 2, 3) to yield carbon monoxide, carbon dioxide and hydrogen:

$$CH_4 + H_2O \rightarrow 3H_2 + CO + 205 \text{ kJ/mol} \quad (1)$$

$$CH_4 + 2H_2O \rightarrow 4H_2 + CO_2 + 164 \text{ kJ/mol} \quad (2)$$

$$CO + H_2O \rightarrow H_2 + CO_2 - 41 \text{ kJ/mol} \quad (3)$$

Whereas reactions (1) and (2) are highly endothermic, reaction (3) is mildly exothermic; thus together they are endothermic. Therefore it is necessary to heat the tubes of the shell side of the primary reformer in order to equalize the energy balance. The fuel gas used for firing the primary reformer can be natural gas or a highly calorific residual gas from another plant section or a mixture of the two gases.

The firing has to be regulated in order keep the temperature constant at all times. The fuel gas used for firing is therefore usually divided into a large portion, which is used for the majority of the firing duty and essentially should remain constant, and a small portion used to control the heating.

Whilst the tube-side synthesis gas reactions usually take place at high pressure (approximately 30 bar in hydrogen production plants and approximately 5 bar in reducing-gas plants), the shell-side heating of the primary reformer is usually performed at a pressure that is just below atmospheric pressure in order to prevent the risk of any emission of flue gas in case of leakages.

The major portion of the fuel gas used for firing must be slightly higher in pressure than that on the shell side, in order to overcome the pressure drop in the jet assembly feeding the gas to the combustion chamber and thus to thoroughly distribute the gas within the combustion chamber. The required inlet pressure is normally approximately 0.3 bar above the pressure level prevailing on the shell side in the combustion chamber and is thus approximately 1.3 bar absolute.

The fuel gas portion provided for control must have a slightly higher inlet pressure in order to overcome the pressure drop in the flow control valve. The necessary inlet pressure is usually around 1 bar above the pressure prevailing on the shell side of the combustion chamber and is thus around 2 bar absolute.

In order to adjust these pressure levels, the fuel gas, for example natural gas, which often has a supply pressure of 5 to 60 bar, this being considerably higher than the above mentioned pressures, is depressurised by throttling down to pressures of approximately 1.3 bar and 2 bar absolute. The intention of this invention is to employ an ejector to utilise the work obtainable of the fuel gas resulting from said pressure reduction and which is usually not used at all.

The raw synthesis gas formed by the reaction on the tube side of the primary reformer contains a large amount of carbon monoxide CO which, when producing hydrogen $H_2$ as product gas reacts further in the downstream CO conversion reactor at a high temperature, the reaction (3) being exothermal, as mentioned above. After separation of the process condensate, the synthesis gas essentially consists of hydrogen $H_2$, carbon dioxide $CO_2$, as well as minor residual quantities of the feed gas and traces of side reaction products.

Depending on the intended use of the product gas and the relevant purity requirements, a gas separation process takes place in a downstream unit, in which undesired components of the product gas are separated and removed.

This gas separation process is usually performed in a pressure swing adsorption unit. Such a pressure swing adsorption unit consists of several adsorbers operated cyclically, numerous modes of operation being known from literature relating to the sequence of the cycles.

Patent EP-0 015 413-B1 describes a pressure swing adsorption process for fractionating or purifying gas mixtures, said process permitting the use of a part-stream of said gas mixture as motive gas. It is pointed out that patents DE-33 37 078-A1 and DE-33 29 435-A1 also reflect the state of the art.

All these concepts have in common that each adsorber is initially loaded under pressure with the gas component to be separated, while the product component flows through the adsorber and leaves it through a product line. Thereafter, depressurisation takes place, whereby the adsorbed gas component is desorbed, separated and disposed of separately through a waste gas line. Following this, or alternatively even during the expansion, purging takes place using the product gas for regenerating the adsorbent, the purge gas being usually admixed to the waste gas. After this, the adsorber is repressurised and ready for a new cycle.

The technological differences in the various pressure swing adsorption processes lie primarily in the ways several adsorbers can be coupled in order to attain the smoothest product flow possible, as well as in the method of regulating and monitoring the process and in selecting the pressure level and the purge times.

In plants for the production of hydrogen $H_2$, the pressure level chosen for the desorption and purging is usually that of the major portion of fuel gas used in the primary reformer. This is because the desorbed gas and, in particular, the purge gas are high in calorific value and are suitable for firing on the shell side of the primary reformer and only need to be enriched with some supplementary fuel. Further desorption by vacuum appeared uneconomic to specialists because the use of a vacuum machine was too expensive and consumed too much energy.

In the production of reducing gas, the synthesis gas produced in the primary reformer is usually fed directly to the plant section in which the desired reduction is to take place. The tail gas from the reduction unit is very rich in combustible and recyclable components, but also contains large amounts of water vapour $H_2O$, carbon dioxide $CO_2$ and pollutants, which must be removed. When a pressure swing adsorption unit is used to deplete the carbon dioxide $CO_2$ content of this tail gas, it is common, however, to use a vacuum machine to generate vacuum pressure in order to achieve an adequate desorption effect.

The aim of the invention is to create a solution for utilising the obtainable work of the fuel gas from the pressure swing adsorption unit and which is used to fire the primary reformer.

With a process of the type described above, this aim is met according to the present invention by feeding the waste desorption gas from the pressure swing adsorption unit to the suction inlet side of an ejector which is driven by part of the fuel gas used in the primary reformer, the waste desorption gas being admixed to the main fuel gas stream or to a regulating gas stream, depending on the particular mode of operation.

With the invention, the obtainable work of the fuel gas to be applied can be used to create a vacuum pressure by means of an ejector, making it possible to mix the gas obtained by desorption and that by purging the pressure swing adsorption unit and to utilise this in accordance with the invention. As a result, the total amount of fuel gas necessary for the operation of the primary reformer will not be increased.

In the production of hydrogen, the reason for this is that although the obtainable work of the fuel gas is utilized, the energy required on the firing side with regard to the amount of additional fuel gas for the operation of the primary reformer will only increase by the amount lost because less product gas of high calorific value, i.e. pure hydrogen $H_2$, has to be taken from the product stream for purging and regeneration in the pressure swing adsorption unit under vacuum.

There is a substantial difference between the procedure described in this document and the state of the art mentioned previously, particularly in EP-0 015 413, said difference consisting in the fact that no gas stream obtained in the course of the pressure swing adsorption process is used as motive gas, but reformer gas usually available at higher pressures from a combined process, involving the upstream steam reformer, is exploited. A sufficient quantity of this fuel gas is available and is burnt in the reformer together with the pressure swing adsorption exhaust gas.

The obtainable work of said fuel gas, which is under high pressure, is often neglected; natural gas of, for example, 35 bar available at battery limit is usually depressurised by adiabatic throttling to obtain the burner inlet pressure (about 1.2 to 5 bar). When compared with the known processes it becomes evident that there are considerable advantages which, for example, consist in the fact that the motive gas need not be collected in buffer vessels, which have no operating cycle but which usually operate under a stationary vacuum.

A further advantage of the process in accordance with the invention is that neither inlet gas fed to process unit nor withdrawn product gases are being utilised as motive gas so that in these cases, the product yield is not diminished and thus undergoes a distinct improvement. The quality and amount of the product gases to be withdrawn are the only criterion crucial for the evaluation of hydrogen and synthesis gas production plants, which evidently leads to particular advantages of the invention.

A further advantage of the invention is that no relieved gases are being used as motive gas so that even pressure swing adsorption applications can efficiently desorb under vacuum at low adsorption pressure as, for example, in reduction gas units.

Another advantage is the fact that, for example, the loss in calorific value of the exhaust gas obtained in the pressure swing adsorption plant, which results from admitting additional fuel gas to compensate this loss, is faced with an improved product gas yield so that, when referred to the quantity of product gas produced, one even obtains a depressurisation of additional fuel gas and feed gas, thus permitting a cut in the primary reformer investment costs.

This loss of calorific value in the waste gas from the pressure swing adsorption unit, which must be compensated by additional fuel gas, is relatively small considering the much larger gain in product gas, as a result of which even a saving of additional fuel and feed gas can be achieved in relation to the product gas generated, thus also lowering the investment costs for the primary reformer, these constituting advantages of the invention.

In the production of reduction gas, the reason for this is that the fuel gas stream admixed to the waste gas in the ejector is in any case required to heat the primary reformer and, therefore, only makes a detour on its way to the firing system. In this case the advantage achieved by the invention consists of the elimination of a conventional vacuum compressor with rotating parts, which is clearly more expensive than an ejector and which requires a large amount of electrical power for its operation.

Further embodiments of the invention can be derived from the sub-claims, e.g. one plant for performing the task according to the invention being characterised by an ejector driven by fuel gas with a suction inlet side connection for admixing desorption gas.

It is expedient that the ejector be used to meet both the process and plant requirements in order to raise the pressure of the low-pressure desorption gas to the pressure level of the fuel gas feed tank and/or the regulating fuel-gas.

The invention further provides for both the generation of at least two levels of vacuum pressure and for the usage of those ensuing pressure levels in the desorption step of the pressure swing adsorption unit. At first, only part of the adsorbing components are desorbed by a weak vacuum pressure and subsequently the vacuum is increased in order to perform further desorption.

This step-wise reduction of pressure as well as the use of the vacuum to increase the desorption effect can be performed in several (at least two) stages. The trick is, when examining the flow rates of the ejector streams, that the more powerful the vacuum is desired to be, the higher the volume of ejector motive streams will have to be in order to desorb a certain amount of gas. As the amount of the ejector motive streams is determined by the heat requirements in the primary reformer, the provision of multiple stages instead of a continuous lowering of the vacuum approaches the desired aim more closely, the number of stages as well as the number of pressure levels prevailing in individual cases can be optimised according to economic criteria.

DETAILED DESCRIPTION OF THE INVENTION

Figure 1:
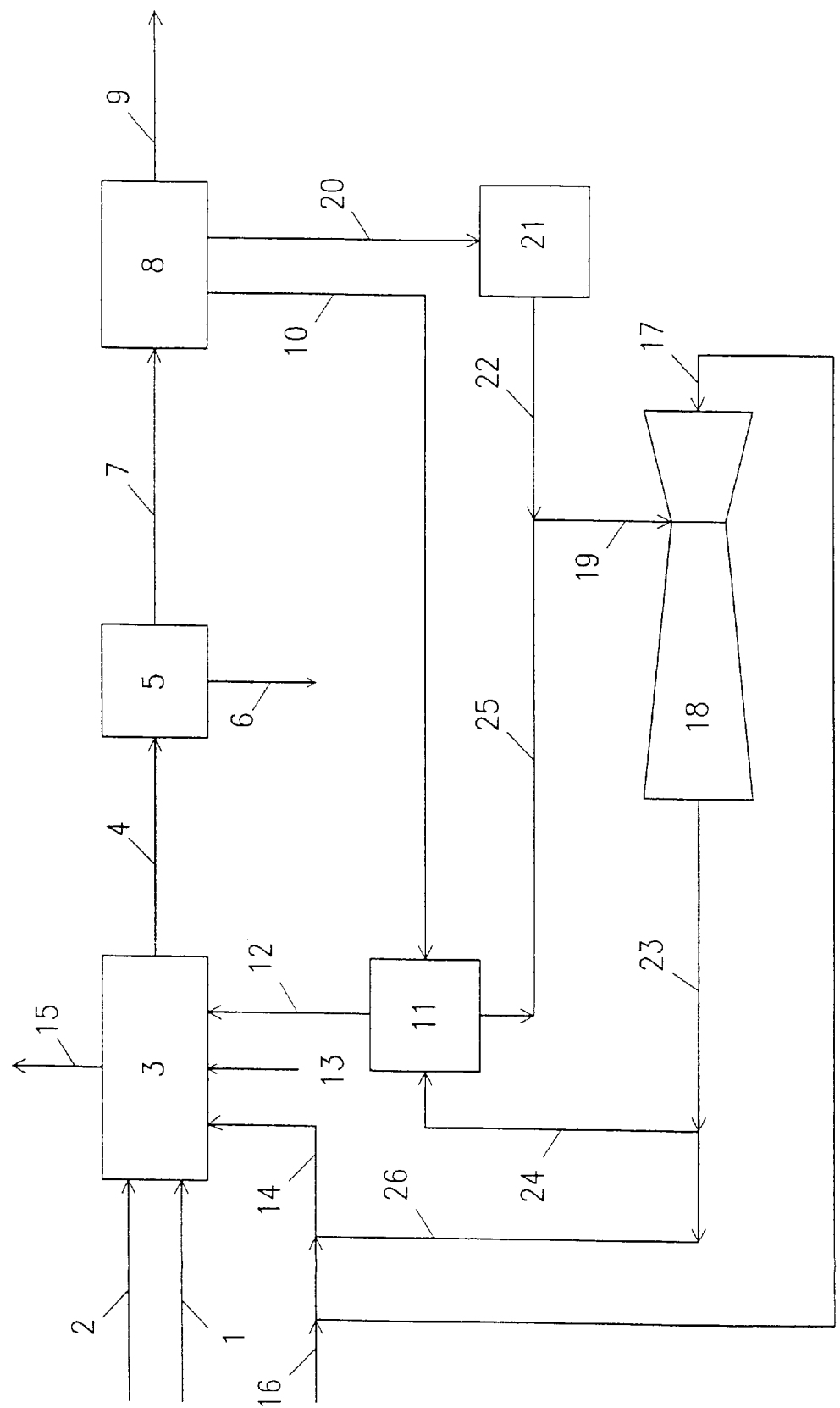
FIG. 1 is a block diagram of the synthesis gas formation and treatment process according to the present invention.

Further characteristics, details and advantages of the invention are revealed in the following description and in the drawing. The only FIGURE shows a hydrogen production plant in which the feed gas (1) and steam (2) are fed to the tube side of a primary reformer (3).

In the following description, certain functions of the plant are also described:

In the primary reformer (3) the endothermic reaction to hydrogen, carbon monoxide and carbon dioxide takes place and the raw synthesis gas (4) is formed, which is cooled and then fed to the CO converter (5). There the rest of the carbon monoxide is transformed by reacting with steam to carbon dioxide and hydrogen. After the synthesis gas has been further cooled, the process condensate (6) is removed.

The dry synthesis gas (7) is fed to a pressure swing adsorption unit (8) which purifies the synthesis gas adsorptively to produce the product gas (9). During desorption, most of the desorbed desorption gas (10), which is high in calorific value, is releaved directly into the fuel gas feed tank (11). From there, the fuel gas (12) is fed to the shell side of primary reformer (3), where it is burned together both with air (13) and with fuel gas used for process control (14) (regulating fuel gas), thus providing the energy for the tube-side endothermic synthesis gas reaction. The exhaust gas (15) from the primary reformer is discharged into the atmosphere.

The regulating fuel gas (14) is taken from the fuel gas stream (16) in no more quantity than necessary for the control of stable combustion on the shell side space of the primary reformer (3). The rest of the fuel gas (16), which is not used as regulating fuel gas (14), serves as the motive fuel gas (17) for the operation of the ejector (18). The ejector (18) serves to reduce the pressure level on the ejector inlet side (19). Depending on the prevailing operating state, this reduction of pressure level is either used to generate vacuum or to produce a regulation gas.

In the first case—that is to say in the normal case-vacuum gas (22) is extracted from the vacuum vessel (21), the vacuum pressure of which permits an additional desorption step to be carried out in the pressure swing adsorption unit (8) by opening vacuum line (20) after shutting off the line for the desorption gas (10), thus increasing the hydrogen yield in the product gas (9). The vacuum gas (22) is mixed with the motive fuel gas (17).in the ejector (18), leaves the ejector (18) as mixed gas (23) and is fed to the fuel gas feed tank (11) via the mixed gas branch line (24). There it is mixed with the remaining desorption gas (10).

In the second case, the ejector (18) serves to increase the amount of gas that must be made available to regulate the primary reformer (3). This case occurs in particular if the desorbed desorption gas (10) by the pressure swing adsorption unit (8) is already sufficient to cover the energy requirements of the primary reformer (3) so that the minimum required amount of regulating fuel gas (14) required for the stable operation of the primary reformer (3) is larger than the amount of energy still needed to carry out the endothermic tube-side reaction.

This would mean that part of the desorption gas (10) would be have to be wasted to ensure that a sufficient amount of the regulating fuel gas (14) is available. In this case the amount of regulating fuel gas (14) can be stretched by adding desorption gas (10), i.e. by connecting the ejector feed side (19) with feed tank (11), thus permitting additional gas (25) to flow to the ejector feed side (19). As a result, the pressure of the mixed gas (23) leaving the ejector is increased to such an extent that the additional gas can be admixed to the regulating fuel gas (14) via the interconnecting line (26) and become available for regulation.

In the production of reducing gas, the CO conversion (5) illustrated in FIG. 1 is replaced by the reduction process, for which the reduction gas is produced, with downstream filtration, and the export line (9) for product gas is replaced by a pure gas side recycle line to the reduction process with integrated re-compression to compensate for the gas-side pressure drop.

What is claimed is:

1. A process for the production of at least one member selected from the group consisting of a synthesis gas and a reducing gas by means of a primary reformer heated on the shell side and operated in conjunction with a pressure swing adsorption unit to yield at least one member selected from the group consisting of pure hydrogen and reducing gas from the synthesis gas, said process comprising the steps of:

heating a feed gas in a primary reformer to produce a raw synthesis gas;

fueling said primary reformer by feeding to it a main fuel gas stream, which splits into a fuel gas regulatory stream and an operating gas stream;

treating the raw synthesis gas to produce a processed synthesis gas, and feeding the processed synthesis gas to a pressure swing adsorption unit wherein is formed a waste desorption gas;

removing said waste desorption gas from the pressure swing adsorption unit and feeding it to the inlet side of an ejector;

fueling said ejector by feeding to it, the operating gas stream;

admixing said waste desorption gas with the operating gas stream in the ejector, to yield a gas mixture stream dividable into first and second sub-streams; and feeding said first sub-stream to a fuel tank supplying the primary reformer, and/or feeding said second sub-stream to admix with the fuel gas regulatory stream.

2. Process according to claim 1, further comprising the step of:

raising the pressure of the waste desorption gas in the ejector, to the pressure level of a fuel tank for the primary reformer.

3. Process according to claim 1 or 2, further comprising the step of:

raising the pressure of the waste desorption gas in the ejector to the pressure level of the regulating fuel gas used for firing the primary reformer.

4. Process according to claim 1 or 2, further comprising the steps of:

generating a vacuum, and applying the vacuum to the desorption step carried out in the pressure swing adsorption, in at least two stages.

* * * * *